(12) United States Patent
Rivolta et al.

(10) Patent No.: US 11,163,381 B2
(45) Date of Patent: Nov. 2, 2021

(54) LOW-POWER POINTING METHOD AND ELECTRONIC DEVICE IMPLEMENTING THE POINTING METHOD

(71) Applicant: STMicroelectronics S.r.l., Agrate Brianza (IT)

(72) Inventors: Stefano Paolo Rivolta, Desio (IT); Federico Rizzardini, Settimo Milanese (IT); Lorenzo Bracco, Chivasso (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 16/924,792

(22) Filed: Jul. 9, 2020

(65) Prior Publication Data

US 2021/0034170 A1   Feb. 4, 2021

(30) Foreign Application Priority Data

Jul. 31, 2019   (IT) .................. 102019000013422

(51) Int. Cl.
| | |
|---|---|
| *G06F 3/0346* | (2013.01) |
| *G09G 5/08* | (2006.01) |
| *G06F 3/038* | (2013.01) |
| *G06F 3/0354* | (2013.01) |

(52) U.S. Cl.
CPC .......... *G06F 3/0346* (2013.01); *G06F 3/0383* (2013.01); *G06F 3/03545* (2013.01); *G09G 5/08* (2013.01); *G09G 2354/00* (2013.01)

(58) Field of Classification Search
CPC .. G06F 3/0346; G06F 3/03545; G06F 3/0383; G09G 5/08; G09G 2354/00
See application file for complete search history.

(56) References Cited

U.S. PATENT DOCUMENTS

| | | | |
|---|---|---|---|
| 5,902,968 A | 5/1999 | Sato et al. | |
| 6,377,906 B1* | 4/2002 | Rowe | G01C 21/16 702/151 |
| 6,993,451 B2* | 1/2006 | Chang | G06F 3/0346 702/153 |
| 7,089,148 B1* | 8/2006 | Bachmann | A61B 5/1114 600/595 |
| 8,614,672 B2* | 12/2013 | Ohta | A63F 13/5255 345/158 |
| 9,068,843 B1 | 6/2015 | Sohn et al. | |

(Continued)

*Primary Examiner* — Bryan Earles
(74) *Attorney, Agent, or Firm* — Slater Matsil, LLP (57) ABSTRACT

A low-power pointing method and an electronic device are disclosed. In an embodiment, an electronic device includes a first processor configured to receive attitude quaternion data, indicative of an orientation of the electronic device in a 3D-space, generated by a sensor-fusion algorithm from joint processing of an acceleration signal, indicative of acceleration acting on the electronic device along three reference axes of the 3D-space, and of a gyroscope signal, indicative of angular rate of rotation of the electronic device about the three reference axes of the 3D-space, process the quaternion data to determine an orientation difference between a current orientation and a previous orientation of the electronic device in the 3D-space, translate the orientation difference from the quaternion space to a tilt-compensated angular rate of rotation of the electronic device in the 3D-space and generate screen-frame displacement data based on the tilt-compensated angular rate of rotation.

19 Claims, 3 Drawing Sheets

(56) References Cited

U.S. PATENT DOCUMENTS

| | | | |
|---|---|---|---|
| 9,372,549 B2* | 6/2016 | Meriheina | G06F 3/0346 |
| 2009/0009471 A1* | 1/2009 | Yamamoto | G06F 3/0346 |
| | | | 345/158 |
| 2011/0163950 A1* | 7/2011 | Ye | G09G 5/00 |
| | | | 345/157 |
| 2013/0253821 A1 | 9/2013 | Joseph et al. | |
| 2018/0088685 A1 | 3/2018 | Sang et al. | |
| 2019/0018499 A1 | 1/2019 | Micali et al. | |

* cited by examiner

LOW-POWER POINTING METHOD AND ELECTRONIC DEVICE IMPLEMENTING THE POINTING METHOD

CROSS-REFERENCE TO RELATED APPLICATIONS

This application claims the benefit of IT Patent No. 102019000013422, filed on Jul. 31, 2019, which application is hereby incorporated herein by reference.

TECHNICAL FIELD

The present solution relates to a low power pointing method and to an electronic device implementing the pointing method.

BACKGROUND

As it is known, pointing algorithms are commonly used in pointer electronic devices and are going to be implemented in smart pens (or digital pens or styluses or smart pencils or similar handheld devices having further and different functions in addition to the pointing function), to be coupled to an electronic apparatus acting as a host apparatus (e.g. a laptop, a tablet, a smart TV, a monitor or a smartphone).

These electronic devices implement a HID (Human Interface Device) pointer (or mouse) interface, or protocol, in order to send displacement information (in particular, information associated to a displacement between a current and a previous position) to the host apparatus, in terms of coordinates in a screen-frame of the same host apparatus. A control unit of the host apparatus is thus able to move a displayed object (e.g. a cursor or the like) in the screen-frame based on the received displacement information.

The pointer device reporting rate (i.e. the time interval between consecutive transmissions of displacement information to the host device) may differ based on application requirements, generally with the aim to achieve a desired trade-off between power consumption and performance.

As it is known, new generation devices (in particular, the above cited smart pens or similar devices) require a very low-power consumption in order to improve battery life.

SUMMARY

Two main solutions of pointing algorithms are conventionally implemented in pointer electronic devices.

A first solution envisages the use of only a gyroscope sensor and proper remapping of gyroscope measurements in screen-frame displacements, by selecting two axes of interest from the three measurement axes of the gyroscope sensor. This solution is lightweight and entails a low power consumption. However, it is not tilt-compensated, forcing the user to keep the pointer device in a fixed orientation to have a reliable pointing result.

A second solution envisages the use of ad-hoc (i.e. purposely developed and implemented) dedicated sensor-fusion algorithms based on measurements from both accelerometer and gyroscope sensors. This solution has the advantage of allowing tilt-compensation of gyroscope measurements using accelerometer measurements. The compensated gyroscope measurements can then be remapped in displacements in the screen frame. However, this kind of solution is rather complex (e.g. using complex filters, such as a Kalman filter or similar), thus requiring a high computing power and consequently a high power consumption.

In addition, since this solution is ad-hoc implemented, it usually cannot be re-used in other applications/contexts.

As previously discussed, implementation of pointing algorithms in pointer devices, in particular in smart pens or similar devices, entails very stringent requirements, among which:
- limited power consumption (due to the fact that size, and consequently battery size, is limited and device battery duration is a key design parameter);
- a short execution time; and
- a reduced memory occupation, e.g., allowing implementation in BLE (Bluetooth Low Energy) microcontrollers, which allocate most resources to the Bluetooth stack (the memory size available for other algorithms being thus limited).

Moreover, a tilt compensation feature is required (and it is not achievable with gyroscope data only), since the user cannot be forced to maintain a fixed device orientation during its use.

Embodiments provide solutions in order to solve the problems highlighted previously for known pointing algorithms, and to provide an improved pointing solution allowing that satisfies the above requirements.

Further embodiments provide a pointing method and a corresponding electronic device.

BRIEF DESCRIPTION OF THE DRAWINGS

For a better understanding of the present invention, embodiments are now described, purely by way of non-limiting example and with reference to the attached drawings, wherein.

DETAILED DESCRIPTION OF ILLUSTRATIVE EMBODIMENTS

Figure 1:
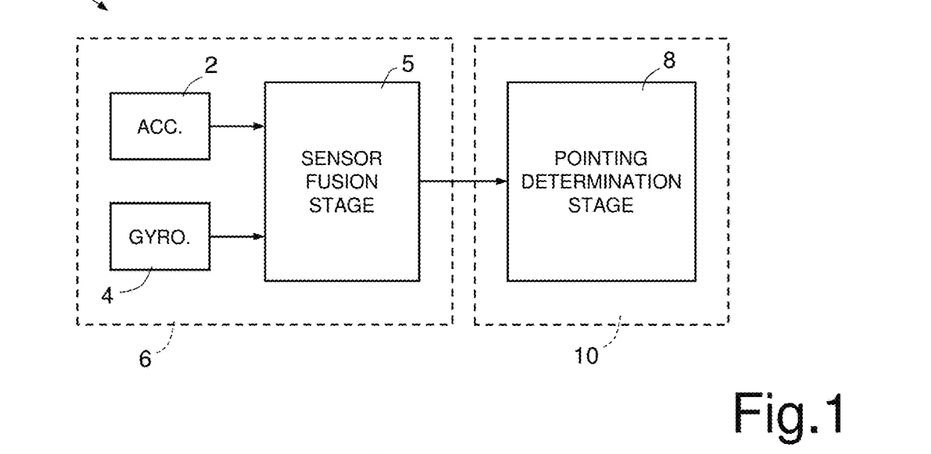
FIG. 1 shows a schematic block diagram of an electronic device implementing a pointing algorithm, according to an embodiment of the present solution.

FIG. 1 shows an electronic device 1 according to an embodiment of the hand-held or portable type, which comprises, within a case or housing thereof:

an accelerometer sensor 2, in particular a MEMS (Micro Electro Mechanical System) triaxial accelerometer, providing an accelerometric signal Acc[x, y, z] indicative of the accelerations acting on the electronic device 1 along the three axes X, Y, Z of a 3D-space inertial reference system associated to the same electronic device 1 (in the following discussion, the axes X, Y, Z of the 3D-space inertial reference system follow the so-called "ENU", East North Up, orientation, according to which axis X points East, axis Y points North, and axis Z points upwards);

a gyroscope sensor 4, in particular a MEMS triaxial gyroscope, providing a gyroscopic signal Gyro[x, y, z]

indicative of the angular rate about the three axes X, Y, Z of the 3d-space inertial reference system associated to the electronic device 1; and a sensor-fusion processing stage 5, coupled to the accelerometer sensor 2 and to the gyroscope sensor 4, to receive at its input the accelerometric signal Acc[x, y, z] and the gyroscopic signal Gyro[x, y, z], and configured to jointly process the accelerometric and gyroscopic signals in order to determine the angular position, or orientation, of the electronic device 1 in the three-dimensional space defined by the three axes X, Y, Z (in the following denoted as "Earth frame") and to generate at the output a corresponding attitude (or orientation) quaternion q.

In particular, and in a known manner, the attitude quaternion q is a 6-DoF (Degree of Freedom) quaternion containing information about the orientation of the electronic device 1 in the Earth frame and can be represented as an array of four real numbers $[q_0, q_1, q_2, q_3]$.

First, second and third vector components $q_1, q_2, q_3$ define a vector in the Earth frame and angular component $q_0$ defines an angular rotation about the same vector, thereby defining the orientation of the electronic device 1.

As it is known, in a 3D-space, according to Euler's rotation theorem, a rotation of a body about a fixed point is equivalent to a single rotation by an angle θ around a fixed axis (the Euler axis) that goes through the fixed point; the Euler axis is represented by a unit vector, or vector, $\vec{u}$. Therefore, any rotation in the 3D-space can be represented as a combination of a vector $\vec{u}$ and a scalar θ.

Quaternions allows to encode this axis/angle representation in four numbers: in particular, a rotation by an angle of θ around the axis defined by vector $\vec{u}$:

$$\vec{u}=(u_x,u_y,u_z)=u_x i+u_y j+u_z k$$

can be represented by a quaternion q:

$$q = e^{\frac{\theta}{2}(u_x i+u_y j+u_z k)} = \cos\frac{\theta}{2} + (u_x i + u_y j + u_z k)\sin\frac{\theta}{2}$$

Referring to the expressions above, the quaternion components $[q_0, q_1, q_2, q_3]$ can be expressed as $[\cos(\theta/2), \sin(\theta/2)u_x, \sin(\theta/2)u_y, \sin(\theta/2)u_z]$, where $\vec{u}=[u_x, u_y, u_z]$ defines the vector in the Earth frame and θ defines the angular rotation around the same vector.

The sensor-fusion stage 5 implements any suitable generic attitude-filter algorithm, for example a complementary-filter algorithm, to combine the accelerometric signal Acc[x, y, z] and the gyroscopic signal Gyro[x, y, z] and to generate at the output the attitude quaternion q (it is underlined, in any case, that the present disclosure is not to be intended limited to a particular implementation of the sensor-fusion stage 5, which may be of any known type allowing to generate at the output the attitude quaternion q based on accelerometer and gyroscope input signals).

An attitude-filter algorithm that may be implemented to generate the attitude quaternion q is for example disclosed in U.S. Patent Application Publication No. 2019/018499 A1.

According to a possible embodiment, as schematically shown in the same FIG. 1, the accelerometer sensor 2, the gyroscope sensor 4 and the sensor-fusion stage 5 may be implemented in a same hardware module 6 (in particular in a same packaged chip integrating both accelerometer and gyroscope sensors 2, 4 and the sensor-fusion stage 5, e.g. made as an ASIC—Application Specific Integrated Circuit).

The electronic device 1 further comprises a pointing determination stage 8, coupled to the sensor-fusion stage 5, to receive the attitude quaternion q at preset time intervals, each received quaternion $q_i$ being indicative of the orientation of the electronic device 1 at the corresponding time t1.

The pointing determination stage 8 is configured to perform a pointing algorithm for translation from the quaternion space to displacements in the screen frame (i.e. within a displayed area of a host apparatus coupled to the electronic device 1, as will also be discussed in the following) in few and easy-to-compute operations (requiring a low energy, e.g. in the order of μA).

According to a possible embodiment, as schematically shown in the same FIG. 1, the pointing determination stage 8 may be implemented in a control unit 10, having a microcontroller or similar processing or computing unit 80a and a suitable non-volatile memory 10b storing computing instructions to execute the pointing algorithm and generate at the output displacement information to be received by the coupled host apparatus to implement a user interface (for example for moving a cursor or a similar displayed element on the screen of the same coupled host apparatus).

In this embodiment, the pointing determination stage 8 constitutes the control unit 10 programmed by a software add-on in addition to the hardware module 6, envisaging, as will be discussed in detail hereinafter, minimal use of resources.

The control unit 10 implementing the pointing determination stage 8 may be a dedicated control unit, or may also have other functions, e.g. being a BLE (Bluetooth Low Energy) control unit implementing, possibly among other features, a Bluetooth low-power wireless communication between the electronic device 1 and the coupled host apparatus.

Figure 2:
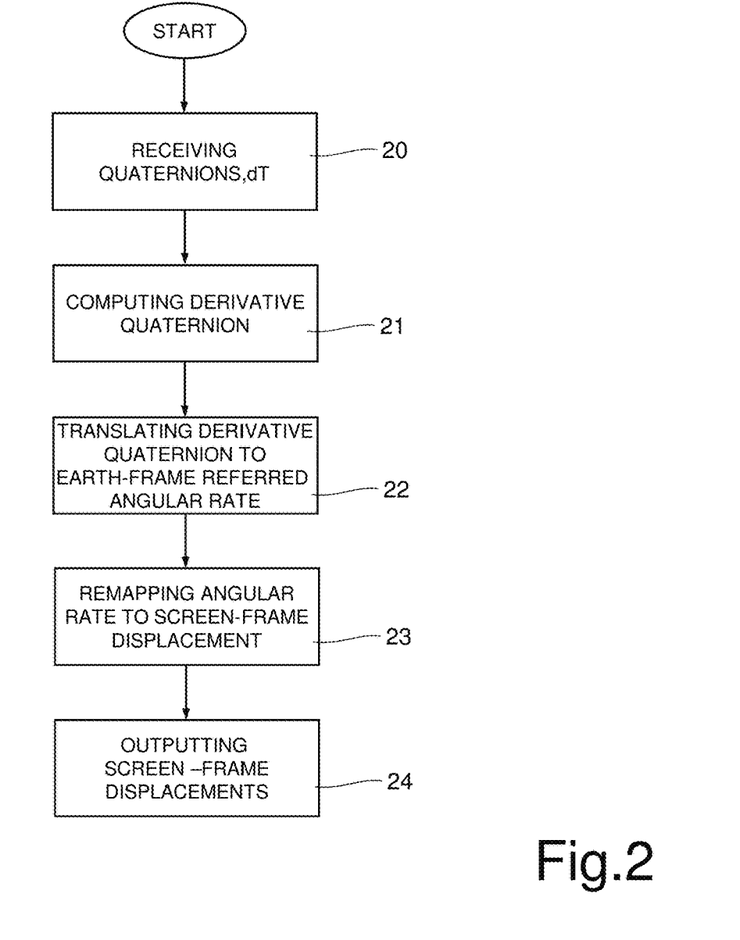
FIG. 2 is a schematic flow chart of operations performed according to the pointing algorithm.

In more detail and with reference also to FIG. 2, the pointing determination stage 8 receives, as shown at step 20, as the inputs of the pointing algorithm, the attitude quaternions $q_i$ from the sensor-fusion processing stage 5, and, moreover, a time interval dt, which corresponds to the time interval between two consecutive calls of the pointing algorithm, i.e. the time between a current quaternion $q_i$ and a past or previously received quaternion $q_{i-1}$ (for example, dt may have a value of 10 ms, in case of a running or operating frequency of 100 Hz).

As shown at step 21, the pointing determination stage 8 then determines the derivative quaternion dq in the Hamilton algebra (ℍ algebra derivative), i.e. in the quaternion algebra, between the current quaternion $q_i$ (representing the current orientation of the electronic device 1) and the previous quaternion $q_{i-1}$ (representing the previous orientation of the electronic device 1).

The derivative quaternion dq is calculated using the following formula, expressed in quaternion algebra:

$$dq=q_i*q_{i-1}^{-1}$$

where * denotes the quaternion (or Hamilton) multiplication, −1 at the exponent represents the quaternion inverse (i.e. the quaternion with the vector components $[q_1,q_2,q_3]$ given by the multiplication of the original vector components by −1).

In order to avoid calculus errors, the shortest path between the two quaternions $q_i$ and $q_{i-1}$ is considered when calculating the derivative quaternion dq. In particular, if the dot (scalar) product between the two quaternions $q_i$ and $q_{i-1}$ is less than 0 (negative), one of the two quaternions is reversed (multiplying all its components $[q_0,q_1,q_2,q_3]$ by −1).

Since the two quaternions $q_i$, $q_{i-1}$ represent two rotations (actually, the two orientations of the electronic device 1 in the Earth frame at the respective times t and t−1), the derivative quaternion dq represents the orientation difference in the same Earth frame (that is tilt-compensated by nature, since the attitude quaternion q is based on both gyroscope and accelerometer data, as discussed previously).

As shown at step 22, the pointing determination stage 8 then implements a translation of the derivative quaternion to the corresponding angular rate (referred to the Earth frame).

In particular, the derivative quaternion dq is translated to angular rate values, by inversely applying the quaternion definition and dividing by the time interval dt, according to the following expressions:

$$g_x = \frac{2 \cdot a\sin(dq_1)}{dt}$$

$$g_y = \frac{2 \cdot a\sin(dq_2)}{dt}$$

$$g_z = \frac{2 \cdot a\sin(dq_3)}{dt}$$

where $g_x$, $g_y$, $g_z$ are the angular rate components of rotation of the electronic device 1 in the Earth frame, around the X, Y and Z axes and a sin represents the arcsine function.

According to an aspect of the present solution, considering that the value of the interval dt is small and applying the notable limit of the sine function:

$$\lim_{x \to 0} \frac{\sin x}{x} = 1$$

an approximation can be applied allowing to remove the (computationally inefficient) a sin trigonometric function, obtaining the following approximated expressions:

$$g_x = \frac{2 \cdot dq_1}{dt}$$

$$g_y = \frac{2 \cdot dq_2}{dt}$$

$$g_z = \frac{2 \cdot dq_3}{dt}$$

where the array $g[g_x, g_y, g_z]$ contains the angular rate components referred to the Earth frame.

As shown at step 23, the pointing determination stage 8 then implements a remapping of the angular rate of the electronic device 1 into displacements into the screen-frame bidimensional space coordinates, denoted in the following as [x',y'].

Figure 3A:
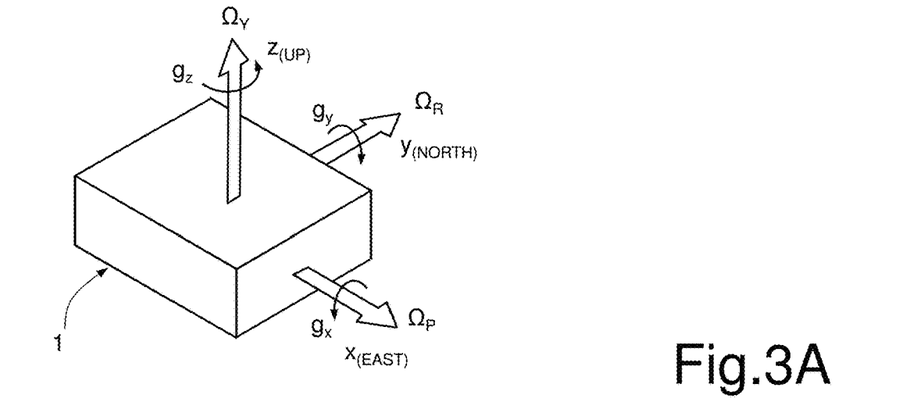
FIG. 3A is a schematic depiction of the electronic device and corresponding angular rates.
Figure 3B:
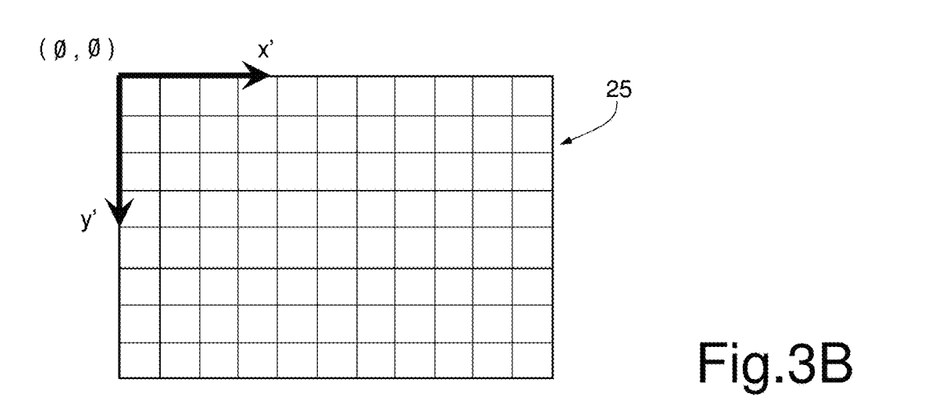
FIG. 3B is a schematic depiction of a screen-frame where displacements generated at the output by the pointing algorithm are performed.

In this respect, FIG. 3A schematically shows the electronic device 1 and its angular rates, considering the ENU device orientation: the roll rate $\Omega_R$ about the Y (North) axis; the pitch rate $\Omega_P$ about the X (East) axis; and the yaw rate $\Omega_Y$ about the Z (Up) axis. FIG. 3B schematically shows the screen frame, here denoted with 25, having a bidimensional surface defined by coordinates x', y' (with the origin (0,0) at the upper left corner).

In this embodiment, the axes remapping can thus be implemented as follows:

$$x' = -g_z \cdot \sigma$$

$$y' = -g_x \cdot \sigma$$

The above expressions corresponds to selection of the Earth frame yaw rate (i.e. the angular rate about the Z axis) as the x' displacement in the screen frame; and the Earth frame pitch rate (i.e. the angular rate about the X axis) as the y' displacement in the same screen frame; the two values are multiplied by −1 in order to be correctly remapped into screen space, as clearly seen in FIG. 3B.

Moreover, multiplication by a scale factor σ, being indicative of the pointer sensitivity, is applied in order to get a desired pointer speed, i.e. a desired movement speed of the cursor or other element displayed on the screen and moving according to the displacement information provided by the electronic device 1 to the host apparatus.

As shown at step 24, the pointing determination stage 8 then outputs the computed [x',y'] values of displacement and send these displacement information to the host apparatus (according to a suitable HID protocol data communication).

If required by the HID protocol, the computed [x',y'] values of displacement may be clamped to a respective maximum value allowed (e.g. in the case of an 8-bit representation, values x' and y' may be clamped to ±127).

Figure 4:
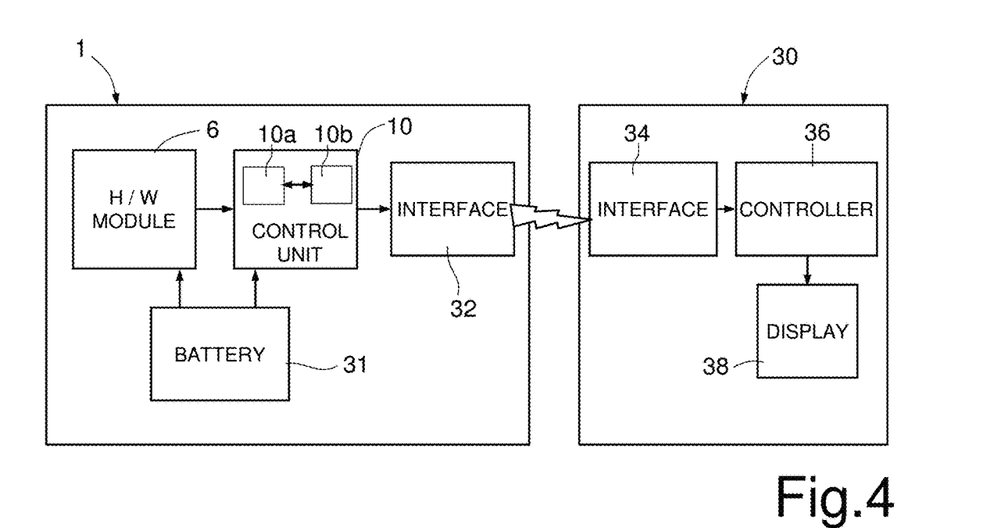
FIG. 4 is a schematic block diagram of a system comprising the electronic device of FIG. 1 and a host apparatus.

FIG. 4 shows the electronic device 1, for example a smart pen or stylus, communicatively coupled to a host apparatus 30, for example a smartphone, phablet or tablet.

As shown in the same FIG. 4, the electronic device 1 may further comprise: a battery 31, providing a power supply to the hardware module 6 (including the accelerometer sensor 2, the gyroscope sensor 4 and the sensor-fusion stage 5) and to the control unit 10 (implementing the pointing determination stage 8); and a communication interface 32, designed for wireless communication to the host apparatus 30.

The same host apparatus 30 may comprise: a respective communication interface 34, to communicate with the communication interface 32 of the electronic device 1; a main controller 36, e.g. a microprocessor unit; and a display 38, defining the screen frame 25, on which movement of a cursor or other similar displayed element is controlled by the main controller 36 according to the computed [x',y'] values of displacement provided by the pointer device 1.

Figure 5A:
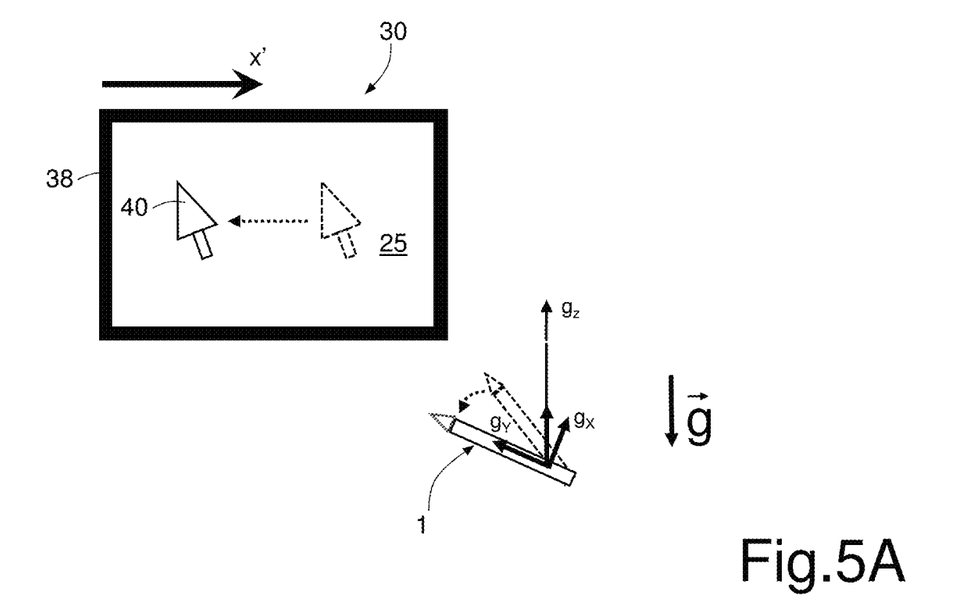
FIGS. 5A and 5B are schematic depictions of the correspondence of respective movements of the electronic device and displacements in a display of the host apparatus.

In this respect, FIG. 5A shows schematically how a rotation of the electronic device 1 (in this case, a smart or digital pen) with a positive angular rate about the Z axis, $g_z$ (i.e. a rotation from east to west, in the "ENU" reference) corresponds to a displacement of a cursor 40 in the screen frame 25 of the display 38 of the host apparatus 30, in particular a leftward displacement along the x' axis (i.e. a negative x' displacement).

Figure 5B:
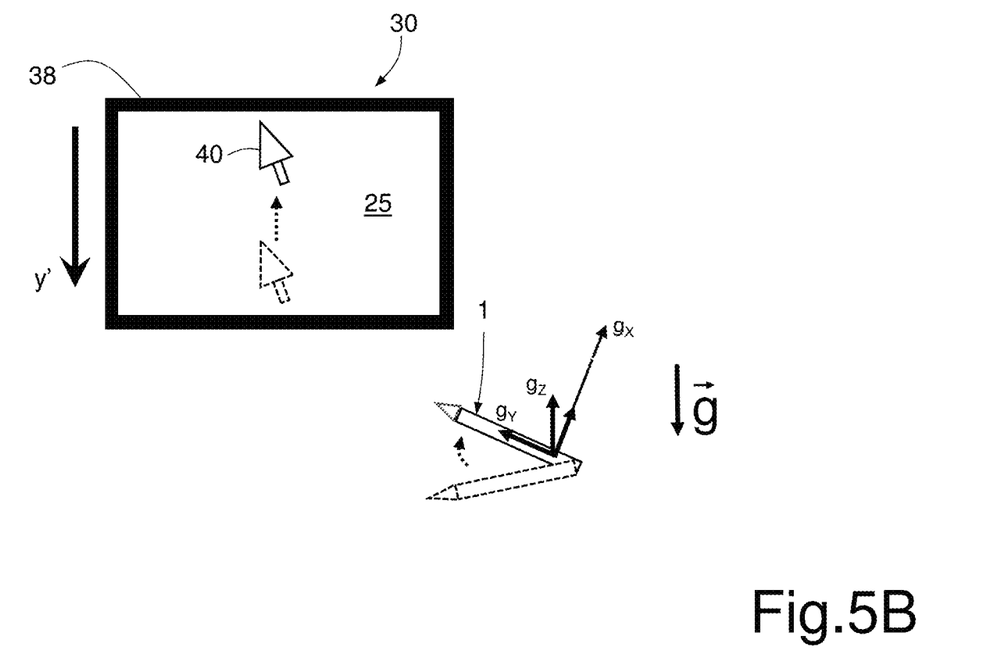

FIG. 5B shows schematically how a rotation of the electronic device 1 (also in this case, a smart or digital pen) with a positive angular rate about the X axis, $g_x$ (i.e. a rotation from down to up, in the "ENU" reference) corresponds to a displacement of the cursor 40 in the screen frame 25 of the display 38 of the host apparatus 30, in particular an upward displacement along the y' axis (i.e. a negative y' displacement).

It is also evident that, in addition to the displacement information, any kind of further information may be communicated between the electronic device 1 and the host apparatus 30.

The advantages of the solution proposed are clear from the foregoing description.

In any case, it is again underlined that the proposed solution, instead of developing a specific ad-hoc sensor fusion algorithm from the accelerometer and gyroscope signals, adds a low-power computation on a generic attitude filter algorithm, providing a 6-DoF attitude quaternion, to determine the screen-frame displacement as a function of the same attitude quaternion.

Advantageously, the generic attitude filter, used as the starting point of the pointing algorithm, can be re-used in other projects/applications.

Moreover, the attitude quaternion, representing the input of the algorithm, is tilt-compensated by nature.

The pointing algorithm performs a translation from quaternion space to the screen-frame space in few easy-to-compute operations, requiring a low-power, e.g. in the order of a few μA, in addition to the MEMS sensor power consumption, and entails a very short operating time and a reduced memory usage.

Finally, it is clear that modifications and variations may be made to what has been described and illustrated herein, without thereby departing from the scope of the present invention, as defined in the annexed claims.

In particular, it is underlined that the pointing determination stage 8 could also be implemented as an hardware module and be integrated in the same packaged chip with the MEMS inertial sensors (the accelerometer and gyroscope and possibly further sensors, such as a magnetometer) and with the related processing circuit.

Moreover, it is again underlined that the electronic device 1 may be a dedicated pointer device or may also have additional functions, besides the implementation of the pointing algorithm (as is the case for a smart pen or similar hand-held electronic device).

What is claimed is:

1. A pointing method comprising:
receiving attitude quaternion data, indicative of an orientation of a pointing electronic device in 3D-space, generated by a sensor-fusion algorithm from joint processing of an acceleration signal, indicative of an acceleration acting on the pointing electronic device along three reference axes of the 3D-space, and of a gyroscope signal, indicative of an angular rate of rotation of the pointing electronic device around the three reference axes of the 3D-space;
processing the quaternion data to determine an orientation difference between a current orientation and a previous orientation of the pointing electronic device in the 3D-space,
wherein processing the quaternion data comprises computing a derivative quaternion between a current quaternion ($q_i$) received at a current time ($t_i$) and a previous quaternion ($q_{i-1}$) received at a previous time ($t_{i-1}$),
wherein the derivative quaternion is computed in a Hamilton algebra according to the following expression:

$$dq = q_i * q_{i-1}^{-1}$$

, and
wherein * denotes a quaternion Hamilton product and -1 at the exponent represents a quaternion inverse;
translating the orientation difference from a quaternion space to a tilt-compensated angular rate of rotation of the pointing electronic device in the 3D-space, wherein translating comprises translating components of the derivative quaternion into corresponding tilt-compensated angular rate of rotation around a respective axis of the 3D-space; and
generating screen-frame displacements based on the tilt-compensated angular rate of rotation.

2. The method according to claim 1, wherein translating comprises determining the corresponding tilt-compensated angular rate of rotation around the respective axis of the 3D-space according to the following expressions:

$$g_x = \frac{2 \cdot \operatorname{asin}(dq_1)}{dt}$$
$$g_y = \frac{2 \cdot \operatorname{asin}(dq_2)}{dt}$$
$$g_z = \frac{2 \cdot \operatorname{asin}(dq_3)}{dt},$$

wherein $g_x$, $g_y$, $g_z$ are angular rate components of rotation of the pointing electronic device in the 3D-space, around the respective axis,
wherein $dq_1$, $dq_2$, $dq_3$ are components of the derivative quaternion relating to the respective axes,
wherein asin is an arcsine function, and
wherein dt is a time interval between the current time ($t_i$) ad the previous time ($t_{i-1}$).

3. The method according to claim 2, wherein the expressions for the tilt-compensated angular rate of rotation are approximated as follows:

$$g_x = \frac{2 \cdot dq_1}{dt}$$
$$g_y = \frac{2 \cdot dq_2}{dt}$$
$$g_z = \frac{2 \cdot dq_3}{dt},$$

wherein an array of $g_x, g_y, g_z$ contains angular rate components referred to the 3D-space.

4. The method according to claim 1, wherein generating the screen-frame displacements based on the tilt-compensated angular rate of rotation in the 3D-space comprises selecting an angular rate of rotation about a third axis (Z), as a displacement along a horizontal direction (x') in a screen frame and an angular rate about a first axis (X), as a displacement along a vertical direction (y') in the screen frame, according to the following expressions:

$$x' = -g_z \cdot \sigma$$

$$y' = -g_x \cdot \sigma,$$

and
wherein x' is the displacement along the horizontal direction (x') in the screen frame, y' is the displacement along the vertical direction (y') in the screen frame, $g_z$ is the angular rate of rotation about the third axis (Z) of the 3D-space, $g_x$ is the angular rate of rotation about the first axis (X) o the 3D-space and σ is a scale factor.

5. An electronic device comprising:
a pointing determination unit configured to:
receive attitude quaternion data, indicative of an orientation of the electronic device in a 3D-space, generated by a sensor-fusion algorithm from joint processing of an acceleration signal, indicative of acceleration acting on the electronic device along three reference axes of the 3D-space, and of a gyroscope signal, indicative of an angular rate of rotation of the electronic device about the three reference axes of the 3D-space;
process the quaternion data to determine an orientation difference between a current orientation and a previous orientation of the electronic device in the 3D-space by computing a derivative quaternion (dq) between a current quaternion ($q_i$) received at a current time ($t_i$) and a previous quaternion ($q_{i-1}$) received at a previous time ($t_{i-1}$), wherein the derivative quaternion (dq) is computed in a Hamilton algebra according to the following expression:

$$dq = q_i * q_{i-1}^{-1},$$

and
wherein * denotes a quaternion Hamilton product and -1 at the exponent represents a quaternion inverse;
translate the orientation difference from a quaternion space to a tilt-compensated angular rate of rotation of the electronic device in the 3D-space by translating components of the derivative quaternion (dq) into corresponding tilt-compensated angular rate of rotation around a respective axis of the 3D-space; and
generate screen-frame displacement data based on the tilt-compensated angular rate of rotation.

6. The device according to claim 5, further comprising:
an accelerometer sensor configured to generate the acceleration signal, indicative of an acceleration acting on the electronic device along the three reference axes of the 3D-space;
a gyroscope sensor configured to generate the gyroscope signal, indicative of the angular rate of rotation of the electronic device around the three reference axes of the 3D-space; and
a sensor-fusion unit configured to jointly process the acceleration signal and the gyroscope signal, to generate a tilt-compensated attitude quaternion data, indicative of the orientation of the electronic device in the 3D-space.

7. The device according to claim 6, wherein the accelerometer sensor, the gyroscope sensor and the sensor-fusion unit are integrated in the same hardware module, wherein the electronic device further comprises a control unit coupled to the hardware module and having a processing unit and a non-volatile memory storing computing instructions, and wherein the processing unit comprises the pointing determination unit.

8. The device according to claim 5, wherein the pointing determination unit is configured to determine the corresponding tilt-compensated angular rate of rotation around the respective axis of the 3D-space, according to the following expressions:

$$g_x = \frac{2 \cdot \operatorname{asin}(dq_1)}{dt}$$

$$g_y = \frac{2 \cdot \operatorname{asin}(dq_2)}{dt}$$

$$g_z = \frac{2 \cdot \operatorname{asin}(dq_3)}{dt},$$

wherein $g_x$, $g_y$, $g_z$ are angular rate components of rotation of the electronic device in the 3D-space, around the respective axis, wherein $dq_1$, $dq_2$, $dq_3$ are components of the derivative quaternion (dq) relating to the respective axis, wherein asin is an arcsine function, and wherein dt is a time interval between the current time ($t_i$) and the previous time ($t_{i-1}$).

9. The device according to claim 8, wherein the pointing determination unit is configured to determine the corresponding tilt-compensated angular rate of rotation about the respective axis of the 3D-space, according to the following approximated expressions:

$$g_x = \frac{2 \cdot dq_1}{dt}$$

$$g_y = \frac{2 \cdot dq_2}{dt}$$

$$g_z = \frac{2 \cdot dq_3}{dt},$$

wherein an array $g[g_x, g_y, g_z]$ contains angular rate components referred to the 3D-space.

10. The device according to claim 5, wherein the pointing determination unit is configured to select the angular rate of rotation around a third axis (Z) as a displacement along a horizontal direction (x') in a screen frame, wherein the angular rate around a first axis (X) as a displacement along a vertical direction (y') in the screen frame, according to the following expressions:

$$x' = -g_z \cdot \sigma$$

$$y' = -g_x \cdot \sigma,$$

wherein x' is the displacement along the horizontal direction (x') in the screen frame, y' is the displacement along the vertical direction (y') in the screen frame, $g_z$ is the angular rate of rotation around the third axis (Z) of the 3D-space, $g_x$ is the angular rate of rotation around the first axis (X) o the 3D-space and a is a scale factor.

11. The device according to claim 5, further comprising a communication interface configured to transmit the screen-frame displacement data to a host apparatus having a display defining a screen frame, wherein the screen-frame displacement data are configured to control movement of a displayed element on the screen frame.

12. An electronic system comprising:
the electronic device according to claim 5 and comprising a communication interface; and
a host apparatus comprising:
a communication interface to communicate with the communication interface of the electronic device, wherein the communication interface of the host apparatus is configured to receive the screen-frame displacement data;
a main controller; and
a display defining a screen frame,
wherein the main controller is configured to control a movement of displayed element according to the screen-frame displacement data received from the electronic device.

13. An electronic device comprising:
a first processor configured to:
receive attitude quaternion data, indicative of an orientation of the electronic device in a 3D-space, generated by a sensor-fusion algorithm from joint processing of an acceleration signal, indicative of acceleration acting on the electronic device along three reference axes of the 3D-space, and of a gyroscope signal, indicative of angular rate of rotation of the electronic device about the three reference axes of the 3D-space;
process the quaternion data to determine an orientation difference between a current orientation and a previous orientation of the electronic device in the 3D-space by computing a derivative quaternion (dq) between a current quaternion ($q_i$) received at a current time ($t_i$) and a previous quaternion ($q_{i-1}$) received at a previous time ($t_{i-1}$), wherein the derivative quaternion (dq) is computed in a Hamilton algebra according to the following expression:

$$dq = q_i * q_{i-1}^{-1},$$

and
wherein * denotes a quaternion Hamilton product and -1 at the exponent represents a quaternion inverse;
translate the orientation difference from a quaternion space to a tilt-compensated angular rate of rotation of the electronic device in the 3D-space by translating components of the derivative quaternion (dq) into corresponding tilt-compensated angular rate of rotation around a respective axis of the 3D-space; and
generate screen-frame displacement data based on the tilt-compensated angular rate of rotation.

14. The device according to claim 13, further comprising:
an accelerometer sensor configured to generate the acceleration signal, indicative of the acceleration acting on the electronic device along the three reference axes of the 3D-space;
a gyroscope sensor configured to generate the gyroscope signal, indicative of the angular rate of rotation of the electronic device around the three reference axes of the 3D-space; and
a second processor configured to jointly process the acceleration signal and the gyroscope signal, to generate a tilt-compensated attitude quaternion data, indicative of the orientation of the electronic device in the 3D-space.

15. The device according to claim 14, wherein the accelerometer sensor, the gyroscope sensor and the second processor are integrated in the same hardware module, and wherein the electronic device further comprises a controller coupled to the hardware module and comprising the second processor and a non-volatile memory storing computing instructions.

16. The device according to claim 13, further comprising a communication interface configured to transmit a screen-frame displacement data to a host apparatus having a display defining the screen frame, wherein the screen-frame displacement data are configured to control movement of a displayed element on the screen frame.

17. The device according to claim 13, wherein the first processor is configured to determine the corresponding tilt-compensated angular rate of rotation around the respective axis of the 3D-space, according to the following expressions:

$$g_x = \frac{2 \cdot \mathrm{asin}(dq_1)}{dt}$$

$$g_y = \frac{2 \cdot \mathrm{asin}(dq_2)}{dt}$$

$$g_z = \frac{2 \cdot \mathrm{asin}(dq_3)}{dt},$$

wherein $g_x$, $g_y$, $g_z$ are angular rate components of rotation of the electronic device in the 3D-space, around the respective axis, wherein $dq_1$, $dq_2$, $dq_3$ are components of the derivative quaternion (dq) relating to the respective axis, wherein asin is an arcsine function, and wherein dt is a time interval between the current time ($t_i$) and the previous time ($t_{i-1}$).

18. The device according to claim 17, wherein the first processor is configured to determine the corresponding tilt-compensated angular rate of rotation about the respective axis of the 3D-space, according to the following approximated expressions:

$$g_x = \frac{2 \cdot dq_1}{dt}$$

$$g_y = \frac{2 \cdot dq_2}{dt}$$

$$g_z = \frac{2 \cdot dq_3}{dt},$$

wherein an array $g[g_x, g_y, g_z]$ contains angular rate components referred to the 3D-space.

19. The device according to claim 13, wherein the first processor is configured to select the angular rate of rotation around a third axis (Z) as a displacement along a horizontal direction (x') in a screen frame, wherein the angular rate around a first axis (X) as a displacement along a vertical direction (y') in the screen frame, according to the following expressions:

$$x' = -g_z \cdot \sigma$$

$$y' = -g_z \cdot \sigma,$$

wherein x' is the displacement along the horizontal direction (x') in the screen frame, y' is the displacement along the vertical direction (y') in the screen frame, $g_z$ is the angular rate of rotation around the third axis (Z) of the 3D-space, $g_x$ is the angular rate of rotation around the first axis (X) o the 3D-space and σ is a scale factor.

* * * * *

UNITED STATES PATENT AND TRADEMARK OFFICE
CERTIFICATE OF CORRECTION

PATENT NO. : 11,163,381 B2
APPLICATION NO. : 16/924792
DATED : November 2, 2021
INVENTOR(S) : Stefano Paolo Rivolta It is certified that error appears in the above-identified patent and that said Letters Patent is hereby corrected as shown below:

In the Specification

On the Detailed Description of Illustrative Embodiments, Column 5, Lines 66-67; delete "$y' = -'g_z \cdot \sigma$" and insert --$y' = -g_x \cdot \sigma$--.

In the Claims

Claim 4, Column 8, Line 46; delete "$y' = -g_z \cdot \sigma$" and insert --$y' = -g_x \cdot \sigma$--.

Claim 10, Column 10, Lines 26-27; delete "$y' = -g_z \cdot \sigma$" and insert --$y' = -g_x \cdot \sigma$--.

Claim 19, Column 12, Line 43-44; delete "$y' = -g_z \cdot \sigma$" and insert --$y' = -g_x \cdot \sigma$--.

Signed and Sealed this
Fourth Day of January, 2022

Drew Hirshfeld
*Performing the Functions and Duties of the*
*Under Secretary of Commerce for Intellectual Property and*
*Director of the United States Patent and Trademark Office*